United States Patent
Matsumura et al.

(10) Patent No.: US 12,532,198 B2
(45) Date of Patent: Jan. 20, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 379 days.

(21) Appl. No.: 18/041,257

(22) PCT Filed: Aug. 12, 2020

(86) PCT No.: PCT/JP2020/030709
§ 371 (c)(1),
(2) Date: Feb. 10, 2023

(87) PCT Pub. No.: WO2022/034655
PCT Pub. Date: Feb. 17, 2022

(65) Prior Publication Data
US 2023/0308913 A1    Sep. 28, 2023

(51) Int. Cl.
*H04W 24/08* (2009.01)
*H04L 5/00* (2006.01)
(52) U.S. Cl.
CPC ......... *H04W 24/08* (2013.01); *H04L 5/0051* (2013.01)
(58) Field of Classification Search
CPC ...... H04W 24/08; H04W 72/04; H04L 5/0051
See application file for complete search history.

(56) References Cited

U.S. PATENT DOCUMENTS

| 2019/0200248 A1* | 6/2019 | Basu Mallick ..... H04L 41/0816 |
| 2023/0036084 A1 | 2/2023 | Siebentritt et al. |
| 2023/0199528 A1* | 6/2023 | Kang ................. H04W 72/046 |
| | | 370/328 |
| 2023/0300645 A1 | 9/2023 | Kwak et al. |

FOREIGN PATENT DOCUMENTS

| JP | 2023506477 A | 2/2023 |
| JP | 2023536723 A | 8/2023 |
| WO | WO-2020054074 A1 * | 3/2020 |
| WO | WO-2020146737 A1 * | 7/2020 ........... H04B 7/0626 |

OTHER PUBLICATIONS

International Search Report issued in PCT/JP2020/030709 on Mar. 30, 2021 (1 page).
Written Opinion of the International Searching Authority issued in PCT/JP2020/030709 on Mar. 30, 2021 (3 pages).
(Continued)

*Primary Examiner* — Michael A Keller
(74) *Attorney, Agent, or Firm* — Osha Bergman Watanabe & Burton LLP

(57) ABSTRACT

A terminal according to one aspect of the present disclosure includes: a receiving section that receives a first reference signal; and a control section that uses a second reference signal, which is not configured as a failure detection resource, for detection of the beam failure after a response to the beam failure detected based on the first reference signal is received. According to one aspect of the present disclosure, a beam failure can be appropriately detected.

7 Claims, 9 Drawing Sheets

(56) References Cited

OTHER PUBLICATIONS

NTT Docomo, Inc.; "Discussion on multi-beam enhancement"; 3GPP TSG RAN WG1 #97, R1-1906225; Reno, USA; May 13-17, 2019 (24 pages).
Qualcomm Incorporated, ZTE Corporation, Sanechips; "Discussion on the necessity of supporting implicit BFD-RS in dormant BWP"; 3GPP TSG RAN WG2 Meeting #110-e, R2-2005694; E-Conference; Jun. 1-12, 2020 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Chinese Application No. 202080106136.4, mailed Jul. 31, 2024 (14 pages).
Moderator (Apple): "Feature Lead Summary #1 on L1-SINR and SCell BFR", 3GPP TSG RAN WG1 #101, R1-2004231; e-Meeting, May 25-Jun. 5, 2020 (17 pages).
Office Action issued in Japanese Application No. 2022-542538, mailed Dec. 3, 2024 (6 pages).
Office Action issued in Chinese Patent Application No. 202080106136.4, issued Mar. 29, 2025 (12 pages).
Office Action issued in Chinese Patent Application No. 202080106136.4, dated Jul. 18, 2025 (12 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). In addition, specifications of LTE-Advanced (3GPP Rel. 10 to Rel. 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In NR, it has been studied to perform procedure for a user terminal (user terminal or user equipment (UE)) to detect a beam failure (BF) and switch to another beam (which may also be referred to as beam failure recovery (BFR) procedure, BFR, or the like).

However, in the current Rel. 16 NR specification, operation of beam failure detection (BFD) after BFR is not clear. If BFD is not appropriately performed, throughput may decrease or communication quality may degrade.

Thus, an object of the present disclosure is to provide a terminal, a radio communication method, and a base station that appropriately detect a beam failure.

Solution to Problem

A terminal according to one aspect of the present disclosure includes: a receiving section that receives a first reference signal; and a control section that uses a second reference signal, which is not configured as a failure detection resource, for detection of the beam failure after a response to the beam failure detected based on the first reference signal is received.

Advantageous Effects of Invention

According to one aspect of the present disclosure, a beam failure can be appropriately detected.

Figure 1:
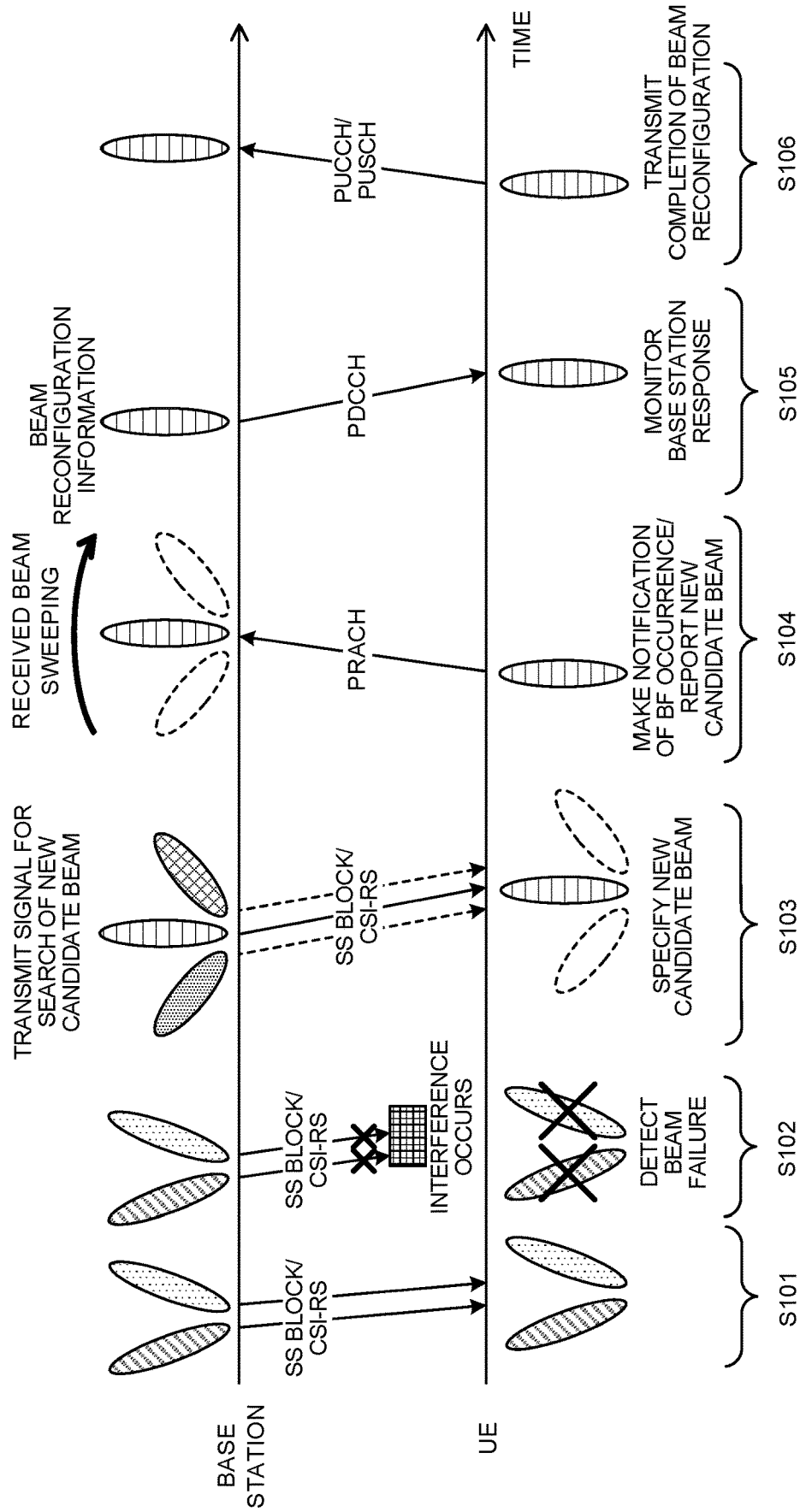
FIG. 1 is a view illustrating an example of beam recovery procedure in Rel. 15 NR.

DESCRIPTION OF EMBODIMENTS (TCI, Spatial Relation, and QCL)

In NR, it has been studied to control reception processing (for example, at least one of reception, demapping, demodulation, or decoding) and transmission processing (for example, at least one of transmission, mapping, precoding, modulation, or encoding) of at least one of a signal or a channel (expressed as a signal/channel) at UE based on a transmission configuration indication state (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel and may also be referred to as, for example, a spatial reception parameter, spatial relation information, or the like. The TCI state may be configured in the UE for each channel or each signal.

The QCL is an indicator indicating statistical property of a signal/channel. For example, in a case where one signal/channel and another signal/channel have a QCL relation may mean that it is possible to assume that at least one of Doppler shift, Doppler spread, an average delay, a delay spread, or a spatial parameter (for example, a spatial Rx parameter) is identical (in QCL with respect to at least one of these) between the plurality of different signals/channels.

Note that, the spatial Rx parameter may correspond to a reception beam of the UE (for example, a reception analog beam), and the beam may be specified based on spatial QCL. The QCL (or at least one element of the QCL) in the present disclosure may be read as spatial QCL (sQCL).

A plurality of types (QCL types) of QCL may be defined. For example, four QCL types A to D with different parameters (or parameter sets) that can be assumed to be identical may be provided. These parameters (which may be referred to as QCL parameters) are as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial reception parameter.

Assumption by the UE that a given control resource set (CORESET), channel, or reference signal has a specific QCL (for example, QCL type D) relation with another CORESET, channel, or reference signal may be referred to as QCL assumption.

The UE may determine at least one of a transmission beam (Tx beam) or a reception beam (Rx beam) of a signal/channel based on a TCI state of the signal/channel or the QCL assumption.

The TCI state may be, for example, information regarding the QCL of a target channel (in other words, a reference signal (RS) for the channel) and another signal (for example, another RS). The TCI state may be configured (specified) by higher layer signaling, physical layer signaling, or a combination thereof.

The physical layer signaling may be, for example, downlink control information (DCI).

A channel for which the TCI state or spatial relation is configured (specified) may be, for example, at least one of a physical downlink shared channel (PDSCH), a physical downlink control channel (PDCCH), a physical uplink shared channel (PUSCH), or a physical uplink control channel (PUCCH).

Furthermore, an RS having a QCL relation with the channel may be, for example, at least one of a synchronization signal block (SSB), a channel state information reference signal (CSI-RS)), a measurement reference signal (sounding reference signal (SRS)), a tracking CSI-RS (also referred to as a tracking reference signal (TRS)), or a QCL detection reference signal (also referred to as a QRS).

The SSB is a signal block including at least one of a primary synchronization signal (PSS), a secondary synchronization signal (SSS), or a broadcast channel (physical broadcast channel (PBCH)). The SSB may be referred to as an SS/PBCH block.

An RS of a QCL type X in the TCI state may mean an RS in a QCL type X relation with (DMRS of) a given channel/signal, and this RS may be referred to as a QCL source of the QCL type X in the TCI state.

Beam Failure Recovery

In NR, communication using beam forming has been studied. For example, UE and a base station (for example, gNodeB (gNB)) may use a beam to be used for signal transmission (which is also referred to as a transmission beam, a Tx beam, or the like) or a beam to be used for signal reception (which is also referred to as a reception beam, an Rx beam, or the like).

In a case where beam forming is used, degradation of radio link quality is assumed because it becomes susceptible to interference by an obstacle. A radio link failure (RLF) may frequently occur due to degradation of the radio link quality. If the RLF occurs, cell re-connection is required, and thus, frequent occurrence of the RLF leads to degradation of system throughput.

In the NR, to reduce occurrence of the RLF, it has been studied to perform procedure of switching to another beam (which may also be referred to as beam recovery (BR), beam failure recovery (BFR), Layer 1/Layer 2 (L1/L2) beam recovery, or the like) in a case where quality of a specific beam degrades. The BFR procedure may be simply referred to as BFR.

Note that a beam failure (BF) in the present disclosure may be referred to as a link failure, a radio link failure (RLF).

FIG. 1 is a view illustrating an example of beam recovery procedure in Rel. 15 NR. The number of beams, or the like, is an example, and is not limited thereto. In an initial state (step S101) in FIG. 1, the UE performs measurement based on a reference signal (RS) resource transmitted using two beams.

The RS may be at least one of a synchronization signal block (SSB) or a channel state information RS (CSI-RS). Note that the SSB may also be referred to as an SS/physical broadcast channel (PBCH) block, or the like.

The RS may be at least one of a primary synchronization signal (primary SS (PSS)), a secondary synchronization signal (secondary SS (SSS)), a mobility reference signal (mobility RS (MRS)), a signal included in an SSB, the SSB, a CSI-RS, a demodulation reference signal (DMRS), a beam-specific signal, or the like, or a signal constituted by extending or changing these. The RS measured in step S101 may be referred to as an RS for beam failure detection (beam failure detection RS (BFD-RS)), or the like.

In step S102, interference in radio waves from the base station occurs, whereby the UE cannot detect the BFD-RS (or reception quality of the RS degrades). Such interference may occur due to, for example, an effect of an obstacle between the UE and the base station, fading, interference, or the like.

After a given condition is satisfied, the UE detects a beam failure. For example, the UE may detect occurrence of a beam failure in a case where a block error rate (BLER) is less than a threshold value for all of the configured BFD-RS (BFD-RS resource configurations). If occurrence of a beam failure is detected, a lower layer (physical (PHY) layer) of the UE may notify (instruct) a higher layer (MAC layer) of a beam failure instance.

Note that a criterion for determination is not limited to the BLER and may be reference signal received power in a physical layer (Layer 1 reference signal received power (L1-RSRP)). Further, instead of RS measurement or in addition to RS measurement, beam failure detection may be performed based on a downlink control channel (physical downlink control channel (PDCCH)), or the like. The BFD-RS may be expected to be in a quasi-co-location (QCL) with a DMRS of the PDCCH to be monitored by the UE.

Here, the QCL is an indicator indicating statistical property of a channel. For example, in a case where one signal/channel and another signal/channel have a QCL relation, this may mean that it is possible to assume that between these plurality of different signals/channels, at least one of a Doppler shift, a Doppler spread, an average delay, a delay spread, or a spatial parameter (for example, spatial Rx filter/parameter, spatial Tx (transmission) filter/parameter) is the same (a QCL relation is established regarding at least one of these).

Note that, the spatial Rx parameter may correspond to a reception beam of the UE (for example, a reception analog beam), and the beam may be specified based on spatial QCL. The QCL (or at least one element of the QCL) in the present disclosure may be read as the spatial QCL (sQCL).

Information regarding the BFD-RS (for example, an RS index, resource, number, number of ports, precoding, or the like), information regarding beam failure detection (BFD) (for example, the above-described threshold value), or the like, may be configured in (notified to) the UE by using higher layer signaling, or the like. The information regarding the BFD-RS may also be referred to as information regarding a resource for BFR, or the like.

In the present disclosure, the higher layer signaling may be any of, for example, radio resource control (RRC)

signaling, medium access control (MAC) signaling, broadcast information, or the like, or a combination thereof.

For example, a MAC control element (CE), a MAC protocol data unit (PDU), or the like, may be used for the MAC signaling. The broadcast information may be, for example, a master information block (MIB), a system information block (SIB), remaining minimum system information (RMSI), other system information (OSI), and the like.

The MAC layer of the UE may start a given timer (which may also be referred to as a beam failure detection timer) in a case where a beam failure instance notification is received from the PHY layer of the UE. The MAC layer of the UE may trigger BFR (for example, start any one of random access procedure to be described later) after receiving the beam failure instance notification a given number of times (for example, beam FailureInstanceMaxCount configured by RRC) or more before the timer expires.

The base station may determine that the UE has detected a beam failure in a case where there is no notification from the UE (for example, a period during which there is no notification exceeds a given period) or in a case where a given signal (beam recovery request in step S104) is received from the UE.

In step S103, for beam recovery, the UE starts search for a new candidate beam to be newly used for communication. The UE may measure a given RS to select a new candidate beam corresponding to the RS. The RS measured in step S103 may be referred to as a new candidate beam identification RS (NCBI-RS), a CBI-RS, a candidate beam RS (CB-RS), or the like. The NCBI-RS may be the same as or different from the BFD-RS. Note that the new candidate beam may be referred to as a new candidate beam, a candidate beam, or a new beam.

The UE may determine a beam corresponding to an RS that satisfies a given condition as a new candidate beam. The UE may determine a new candidate beam based on, for example, an RS whose L1-RSRP exceeds a threshold value among configured NCBI-RSs. Note that a criterion for determination is not limited to L1-RSRP. The determination may be made using at least any one of L1-RSRP, L1-RSRQ, or L1-SINR (signal to noise interference power ratio). L1-RSRP regarding an SSB may also be referred to as SS-RSRP. L1-RSRP regarding a CSI-RS may also be referred to as CSI-RSRP. Similarly, L1-RSRQ regarding an SSB may also be referred to as SS-RSRQ. L1-RSRQ regarding a CSI-RS may also be referred to as CSI-RSRQ. Further, similarly, L1-SINR regarding an SSB may be referred to as SS-SINR. L1-SINR regarding a CSI-RS may be referred to as CSI-SINR.

Information regarding an NCBI-RS (for example, an RS resource, number, number of ports, precoding, or the like), information regarding new candidate beam identification (NCBI) (for example, the above-described threshold value), or the like, may be configured in (notified to) the UE using higher layer signaling, or the like. The information regarding the NCBI-RS may be acquired based on the information regarding the BFD-RS. The information regarding the NCBI-RS may also be referred to as information regarding an NCBI resource, or the like.

Note that the BFD-RS, NCBI-RS, or the like, may be read as a radio link monitoring reference signal (RLM-RS).

In step S104, the UE that has specified the new candidate beam transmits a beam failure recovery request (BFRQ). The beam failure recovery request may also be referred to as a beam recovery request signal, a beam failure recovery request signal, or the like.

The BFRQ may be transmitted using, for example, a physical random access channel (PRACH). The BFRQ may include information on the new candidate beam specified in step S103. A resource for the BFRQ may be associated with the new candidate beam. Notification of the information on the beam may be performed using, for example, a beam index (BI), a port index of a given reference signal, a resource index (for example, CSI-RS resource indicator (CRI), SSB resource indicator (SSBRI)), or the like.

In Rel. 15 NR, contention based BFR (CB-BFR) which is BFR based on contention based random access (CBRA) procedure and contention-free BFR (CF-BFR) which is BFR based on contention-free random access (CFRA) procedure are supported. In the CB-BFR or the CF-BFR, the UE may transmit a preamble (which is also referred to as an RA preamble, a physical random access channel (PRACH), an RACH preamble, or the like) as the BFRQ by using a PRACH resource.

Note that the CF-BFR may also be referred to as CFRA BFR. The CB-BFR may also be referred to as CBRA BFR. The CFRA procedure and the CFRA may be read as each other. The CBRA procedure and the CBRA may be read as each other.

In step S105, the base station that has detected the BFRQ transmits a response signal (which may also be referred to as a "BFR response", "gNB response", or the like) for the BFRQ from the UE. The response signal may include reconfiguration information (for example, DL-RS resource configuration information) for one or more beams.

The response signal may be transmitted, for example, in a UE common search space of the PDCCH. The notification of the response signal may be performed by using a PDCCH (DCI) having a cyclic redundancy check (CRC) scrambled by an identifier (for example, a cell radio network temporary identifier (C-RNTI)) of the UE. The UE may determine at least one of a transmission beam or a reception beam to be used, based on beam reconfiguration information.

The UE may monitor the response signal based on at least one of a control resource set (CORESET) for BFR or a search space set for BFR. For example, the UE may detect the DCI with the CRC scrambled with the C-RNTI in the BFR search space in a CORESET that is individually configured.

For the CB-BFR, it may be determined that contention resolution is successful in a case where the UE receives a PDCCH corresponding to the C-RNTI regarding the UE itself.

Regarding the processing in step S105, a period may be set for the UE to monitor a response from the base station (for example, gNB) for the BFRQ. The period may also be referred to as, for example, a gNB response window, a gNB window, a beam recovery request response window, a BFRQ response window, or the like. The UE may retransmit the BFRQ in a case where no gNB response is detected within the window period.

In step S106, the UE may transmit a message indicating that beam reconfiguration is completed to the base station. The message may be transmitted by the PUCCH or PUSCH, for example.

In step S106, the UE may receive RRC signaling indicating a configuration of a transmission configuration indication state (TCI state) to be used for the PDCCH or may receive a MAC CE indicating activation of the configuration.

Beam recovery success (BR success) may represent a case where the processing reaches step S106, for example. On the other hand, beam recovery failure (BR failure) may correspond to, for example, a case where the number of times of BFRQ transmission has reached a given number, or a beam-failure-recovery-timer has expired.

Note that numbers of these steps are merely numbers for description, and a plurality of these steps may be combined, or the order of these steps may be changed. Further, whether or not to perform BFR may be configured in the UE by using higher layer signaling.

(BFD-RS)

In Rel. 16, for each BWP of one serving cell, the UE may be provided with a set $q_0$ bar of a periodic (P)-CSI-RS resource configuration index by failure detection resources (failureDetectionResources) and at least one set $q_1$ bar of a P-CSI-RS resource configuration index or an SS/PBCH block index by a candidate beam RS list (candidateBeamRSList) or an extended candidate beam RS list (candidateBeamRSListExt-r16) or a candidate beam RS list for SCell (candidateBeamRSSCellList-r16).

The $q_0$ bar is a notation in which an overline is added to "$q_0$". Hereinafter, the $q_0$ bar will be simply denoted as $q_0$. The $q_1$ bar is a notation in which an overline is added to "$q_1$". Hereinafter, the $q_1$ bar will be simply denoted as $q_1$.

The UE may perform L1-RSRP measurement, or the like, by using the RS resource corresponding to the index included in the at least one set of the set $q_0$ or the set $q_1$ and detect a beam failure.

Note that, in the present disclosure, providing the above higher layer parameter indicating information on an index corresponding to BFD resources may be read as, for example, configuring the BFD resources and configuring BFD-RS. In the present disclosure, the BFD resources, the set $q_0$ of the periodic CSI-RS resource configuration index or the SSB index, and the BFD-RS may be read as each other.

If the UE is not provided with $q_0$ for one BWP of its serving cell by its failure detection resources (failureDetectionResources) or a beam failure detection resource list (beam FAilureDetectionResourceList), it is determined to include in the set $q_0$ a P-CSI-RS resource configuration index with the same value as the RS index in the RS set specified by the TCI state (TCI-State) for the corresponding CORESET that the UE uses for PDCCH monitoring. If there are two RS indexes in one TCI state, the set $q_0$ includes RS indexes with QCL type D configuration for the corresponding TCI state. The UE assumes that the set $q_0$ includes up to two RS indexes. The UE assumes a single port RS in the set $q_0$.

Regarding the BFR, the UE may follow at least one of the following operation 1 (BFR for SCell) or 2 (BFR for SpCell).

[Operation 1]

The UE may be provided with the configuration for PUCCH transmission with a link recovery request (LRR) via a scheduling RequestIDForBFR. The UE may transmit at least one MAC CE (BFR MAC CE) that provides one index to at least one corresponding SCell with worse radio link quality than $Q_{out,LR}$ on the first PUSCH. This index is the index $q_{new}$ for the P-CSI-RS configuration or SS/PBCH block provided by the higher layer for the corresponding SCell if configured. After 28 symbols from the last symbol of specific PDCCH reception, the UE may follow at least one of the following operation 1-1 or 1-2. The specific PDCCH reception schedules PUSCH transmission with the same HARQ process number as transmission of the first PUSCH and has a DCI format with a toggled new data indicator (NDI) field value.

[Operation 1-1]

The UE monitors PDCCHs in all CORESETs on the SCell specified by the MAC CE with the same antenna port QCL parameters, if any, as the antenna port QCL parameters associated with the corresponding index $q_{new}$.

[Operation 1-2]

In a case where the following conditions 1 to 3 are satisfied, the UE transmits the PUCCH on the PUCCH-SCell by using the same spatial domain filter as the spatial domain filter corresponding to the index $q_{new}$ and using power with $q_u=0$, $q_d=q_{new}$, and $l=0$ in a transmission power formula.

[[[Condition 1]]] The UE is provided with PUCCH spatial relation information (PUCCH-SpatialRelationInfo) for the PUCCH.

[[[Condition 2]]] The PUCCH with LRR has not been transmitted or has been transmitted on the PCell or PSCell.

[[[Condition 3]]] The PUCCH-SCell is included in the SCell specified by the MAC CE.

Here, a subcarrier spacing (SCS) configuration for the 28 symbols is a minimum value of the SCS configuration of the active DL BWP for PDCCH reception and the SCS configuration of the active DL BWP for at least one SCell.

Note that $q_{new}$ may be an index of a new candidate beam (for example, an SSB/CSI-RS) selected by the UE in the BFR procedure and reported on a corresponding PRACH to a network (or an index of a new beam found in the BFR procedure).

In a normal case, $q_u$ may be a PUCCH P0 ID (p0-PUCCH-Id) indicating P0 for a PUCCH (P0-PUCCH) in a PUCCH P0 set (p0-Set). I may be referred to as an index of a power control adjustment state, an index of a PUCCH power control adjustment state, a closed loop index, or the like. $q_d$ may be an index (for example, set by PUCCH-PathlossReferenceRS) of a path-loss reference RS.

[Operation 2]

The UE may receive a PRACH transmission configuration (PRACH-ResourceDedicatedBFR). For PRACH transmission according to the antenna port QCL parameters associated with the P-CSI-RS resource configuration or SS/PBCH block associated with the index $q_{new}$ provided by the higher layer in a slot n, the UE monitors the specific PDCCH. The specific PDCCH is a PDCCH in the search space set provided by the recovery search space ID (recoverySearchSpace Id) for detection of the DCI format with the CRC scrambled by the C-RNTI or the MCS-C-RNTI starting from a slot n+4 in a window configured by the beam failure recovery configuration (Beam FailureRecoveryConfig). For PDCCH monitoring in the search space set provided by the recovery search space ID and corresponding PDSCH reception, the UE assumes the same antenna port QCL parameters as the antenna port QCL parameters associated with the index $q_{new}$ until the UE receives activation by the higher layer on the TCI state or at least one parameter of the TCI state addition list for PDCCH (tci-StatesPDCCH-ToAddList) or the TCI state release list for PDCCH (tci-StatesPDCCH-ToReleaseList).

The UE may follow the next operation 2-1.

[Operation 2-1]

After the UE detects the DCI format with the CRC scrambled by the C-RNTI or the MCS-C-RNTI in the search space set provided by the recovery search space ID, the UE continues to monitor the PDCCH candidates in the search space set provided by the recovery search space ID until the UE receives a MAC CE activation command for the TCI state or at least one of the TCI state addition list for PDCCH or the TCI state release list for PDCCH.

For the BFR for the PCell/SCell (SpCell/SCell) based on the CBRA/CFRA procedure, the BFD-RS may or does not have to be explicitly configured by the RRC. In a case where the BFD-RS is not configured, the UE assumes a periodic (P)-CSI-RS or SSB that is a PDCCH and a QCL type D as a BFD-RS. In Rel. 15/16, the UE can monitor up to two BFD-RSs.

In Rel. 15/16, the UE continues to monitor the explicitly configured BFD-RS (explicit BFD-RS) until the BFD-RS is reconfigured or disabled by the RRC. In a case where the BFD-RS is explicitly configured by the RRC, the BFR may occur again if the UE performs the BFD using the BFD-RS even after the BFD occurs and the BFR is completed.

For example, in a case where a P-CSI-RS #1 is configured as the BFD-RS by the RRC and the BFR is executed, a beam different from the P-CSI-RS #1 (the TCI state in which the P-CSI-RS #1 is configured as the QCL type D) is considered to be used for the PDCCH after the BFR. According to the current specification, measurement of the BFD after the BFR is performed using the P-CSI-RS #1 configured before the BFR. In other words, even in a case where quality of actual communication is good, the BFR may be executed again (repeatedly) because the BFD is performed using the BFD-RS not related to the quality of communication.

Thus, in a case where the explicit BFD-RS is configured before the beam failure of the SCell for the operation 1, it is considered that the UE stops the explicit BFD-RS monitoring after receiving the SCell BFR response. For example, in a case where at least one of the above-mentioned operation 1-1 or 1-2 is performed, the UE performs the following operation 1-3.

[Operation 1-3]

In a case where the set $q_0$ is provided by a higher layer parameter failure detection resource (failureDetectionResource) or a beam failure detection resource list (BeamFailureDetectionResourceList, failureDetectionResourcesToAddModList), the UE stops monitoring the set $q_0$.

In addition, for the operation 2, in a case where an explicit BFD-RS is configured before the beam failure of the SpCell, it is considered that the UE stops the explicit BFD-RS monitoring after receiving the SpCell BFR response. For example, it is considered that the UE performs the next operation 2-2 instead of the above-mentioned operation 2-1.

[Operation 2-2]

After the UE detects the DCI format with the CRC scrambled by the C-RNTI or the MCS-C-RNTI in the search space set provided by the recovery search space ID, the UE continues to monitor the PDCCH candidates in the search space set provided by the recovery search space ID until the UE receives a MAC CE activation command for the TCI state or at least one of the TCI state addition list for PDCCH or the TCI state release list for PDCCH, and in a case where the set $q_0$ is provided by the failure detection resource (failureDetectionResource), the UE stops monitoring the set $q_0$.

However, the operation of the BFD after completion of the BFR is not clear. If the operation of the BFD is not clear, there is a possibility that communication quality may degrade, throughput may decrease, or the like.

Thus, the present inventors have conceived operation of BFD.

Hereinafter, embodiments according to the present disclosure will be described in detail with reference to the drawings. Radio communication methods according to the respective embodiments may be applied singly or in combination.

In the present disclosure, "A/B" and "at least one of A or B" may be interchangeable.

In the present disclosure, a panel, a beam, a panel group, a beam group, an uplink (UL) transmission entity, a TRP, spatial relation information (SRI), a spatial relation, a control resource set (control resource set (CORESET)), a physical downlink shared channel (PDSCH), a codeword, a base station, a given antenna port (for example, a demodulation reference signal (DMRS) port), a given antenna port group (for example, a DMRS port group), a given group (for example, a code division multiplexing (CDM) group, a given reference signal group, and a CORESET group), a given resource (for example, a given reference signal resource), a given resource set (for example, a given reference signal resource set), a CORESET pool, a PUCCH group (PUCCH resource group), a spatial relation group, a downlink TCI state (DL TCI state), an uplink TCI state (UL TCI state), a unified TCI state (unified TCI state), a QCL, and the like, may be read as each other.

In the present disclosure, the index, the ID, the indicator, the resource ID, and the like may be read as each other.

In the present disclosure, a special cell (SpCell), a primary cell (PCell), and a primary secondary cell (PSCell) may be read as each other. In the present disclosure, a secondary cell (SCell), a cell other than the SpCell, and an SCell other than the PSCell may be read as each other.

(Radio Communication Method)

In the present disclosure, the BFR may be at least one of the operation 1 or the operation 2. The operation 1, the BFR for SCell, and the BFR using PUCCH transmission may be read as each other. The operation 2, the BFR for SpCell, and the BFR using PRACH transmission may be read as each other.

In the present disclosure, the BFR request, the PUCCH, the PUSCH, and the PRACH may be read as each other. In the present disclosure, the BFR response and the specific PDCCH may be read as each other.

In the present disclosure, BFR completion, BFR response reception, and PUSCH transmission for providing an index corresponding to a new beam may be read as each other.

In the present disclosure, the first reference signal, the BFD-RS before completion of the BFR, the explicitly configured BFD-RS, the failure detection resource, the BFD-RS in a case where the BDF-RS is not configured, and the BFD-RS configured by the MAC CE may be read as each other. In the present disclosure, the second reference signal, the BFD-RS after completion of the BFR, the updated BFD-RS, the specific BFD-RS, the BFD-RS in a case where the BDF-RS is not configured, and the BFD-RS configured by the MAC CE may be read as each other. In the present disclosure, at least one of the first reference signal or the second reference signal may be a P-CSI-RS resource or a QCL type D-RS.

First Embodiment

The UE may start a timer after the BFR is completed. The UE may stop monitoring (measuring) the configured BFD-RS until the timer expires.

After expiration of the timer, the UE may monitor the configured BFD-RS.

Figure 2:
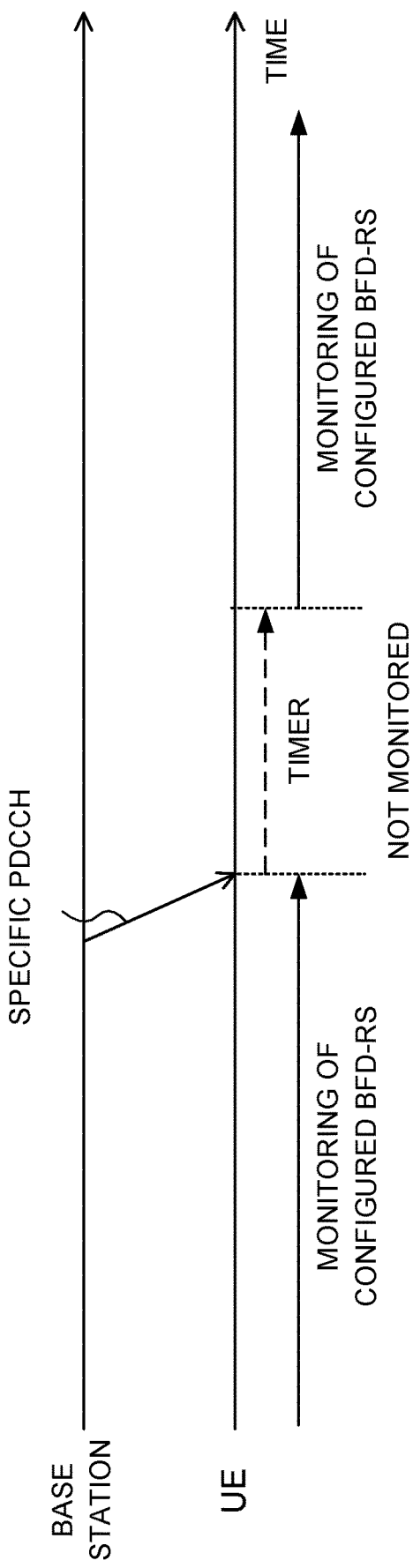
FIG. 2 is a view illustrating an example of BFD-RS monitoring in a first embodiment.

In the example of FIG. 2, after the BFR is completed, the UE does not monitor the configured BFD-RS until the timer expires after the timer is started.

According to the first embodiment described above, unnecessary execution of the BFR immediately after the BFR can be prevented.

Second Embodiment

The UE may update the BFD-RS after completion of the BFR.

The updated BFD-RS (specific BFD-RS) may follow at least one of the following RS1 or RS2:
[RS1]
The updated BFD-RS may be an RS to be used for the new beam specified (selected) by the BFR. The new beam may be $q_{new}$ or may be an SSB corresponding to PRACH transmission or may be a new beam reported by the UE by BFR MAC CE.

In a case where a plurality of QCLs (for example, a QCL type A and a QCL type D) are configured for the TCI state corresponding to the new beam, the updated BFD-RS may be a QCL type D-RS among the plurality of QCLs or may be a QCL type D-RS and a periodic (P)-RS among the plurality of QCLs.
[RS2]
The updated BFD-RS may be an RS to be used for a CORESET/PDCCH beam. The updated BFD-RS may be an RS to be used for BFD in a case where the BFD-RS is not explicitly configured.

The updated BFD-RS may be an RS to be used for a beam (QCL) of a specific CORESET.

The specific CORESET may be CORESET0. For the PCell/SCell (SpCell/SCell), the QCL of CORESET0 is updated to $q_{new}$ after the BFR. In this case, similarly to BFD-RS1, the updated BFD-RS is $q_{new}$.

The BFD-RS may be updated by the MAC CE by the TCI state for CORESET0 being specified by the MAC CE.

The specific CORESET may be a plurality of specific CORESETs. The UE may select a plurality of specific CORESETs. The specific CORESET may be two specific CORESETs.

In a case where more than two CORESETs are configured, the UE may select two specific CORESETs based on a rule. The rule may be based on at least one of a CORESET ID or a minimum or maximum PDCCH monitoring period. For example, the UE may select a CORESET associated with at least one of a minimum or maximum PDCCH monitoring period or a minimum or maximum CORESET ID.

In a case where a plurality of QCLs (for example, a QCL type A and a QCL type D) are configured for the PDCCH TCI state, the updated BFD-RS may be a QCL type D-RS among the plurality of QCLs or may be a QCL type D-RS and a periodic (P)-RS among the plurality of QCLs.

In the RS1, even if the PDCCH TCI state is updated by the MAC CE after the BFR is completed, the BFD-RS is not updated. According to the RS2, the PDCCH TCI state may be updated by the MAC CE or the BFD-RS may be updated.

In at least one of the BFD-RS1 or the BFD-RS2, the UE does not have to monitor the BFD-RS configured by the RRC (does not have to read, may ignore, does not have to receive, may stop monitoring) (the UE may overwrite, by another RS, the BFD-RS configured by the RRC).

Figure 3:
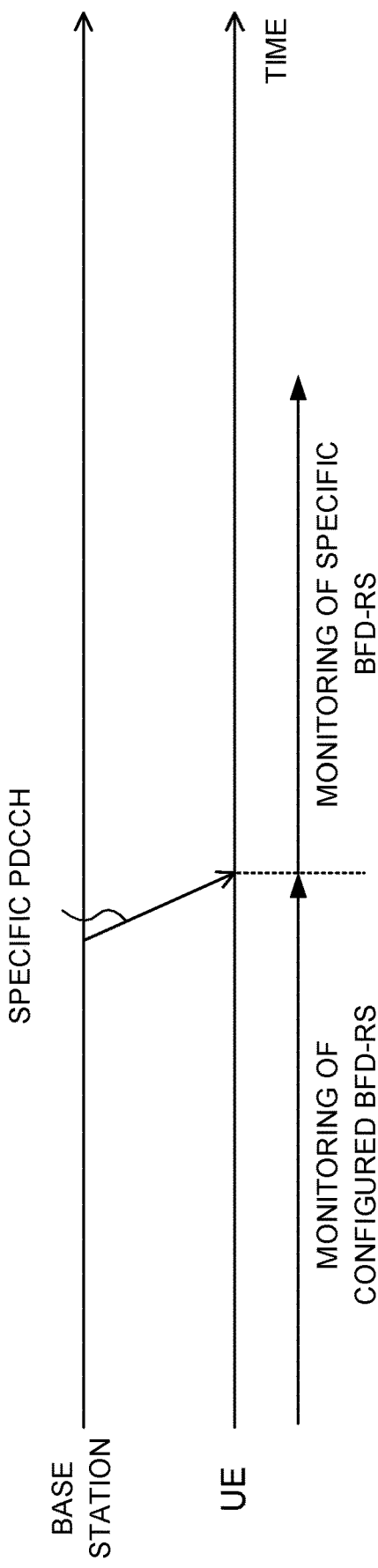
FIG. 3 is a view illustrating an example of BFD-RS monitoring in a second embodiment.

In the example of FIG. 3, after the BFR is completed, the UE monitors the updated BFD-RS instead of the configured BFD-RS.

Until when the updated BFD-RS is applied in at least one of the RS1 or the RS2 may be defined. For example, the UE may use at least one BFD-RS of the RS1 or the RS2 until the BFD-RS is reconfigured by the RRC. For example, the UE may use at least one BFD-RS of the RS1 or the RS2 until a new TCI state of the PDCCH is notified by the RRC/MAC CE.

According to the second embodiment described above, it is possible to update the BFD-RS and prevent unnecessary execution of the BFR.

Third Embodiment

The BFD-RS does not have to be configured by the RRC.

The UE does not have to assume that BFD-RS is explicitly configured (by the RRC). The UE may only assume operation in a case where the BFD-RS is not configured. Similar to Rel. 15/16, the UE uses the BFD-RS (a QCL Type D P-CSI-RS for CORESET, a default BFD-RS) in a case where the BFD-RS is not configured for BFD.

Figure 4:
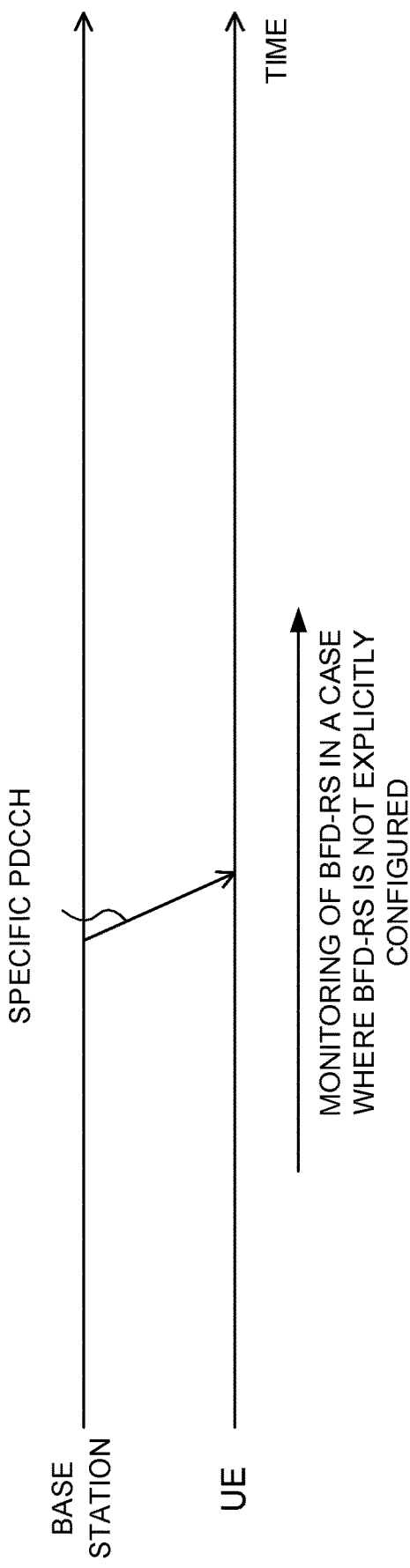
FIG. 4 is a view illustrating an example of BFD-RS monitoring in a third embodiment.

In the example of FIG. 4, before the BFR is completed and after the BFR is completed, the UE monitors the BFD-RS in a case where the BFD-RS (failure recovery resource) is not configured by the higher layer parameters.

The BFD-RS may be notified by the MAC CE or may be notified by at least one of the RRC or the MAC CE. The MAC CE may follow at least one of the following MAC CE1 or MAC CE2:
[MAC CE1]
In a case where a TCI state of a specific CORESET is notified by an existing MAC CE (TCI State Indication for PDCCH MAC CE, TCI State Indication for UE-specific PDCCH MAC CE), the UE may use a QCL type D-RS of the TCI state as the BFD-RS. The reserved bit of the existing MAC CE may be used to distinguish between the operation of the third embodiment and the existing operation. In a case where the QCL type D-RS is specified by the reserved bit, the UE may use the QCL type D-RS in the TCI state specified by its MAC CE as the BFD-RS.
[MAC CE2]
A new MAC CE may be defined. The new MAC CE may follow at least one of the following notification methods 1 to 3:
[Notification Method 1]
The BFD-RS index may be notified by a field in the MAC CE. At least one of the SSB index or the CSI-RS index is notified by the MAC CE, and the UE may use the notified index as the BFD-RS for BFD.
[Notification Method 2]
The TCI state ID may be notified by a field in the MAC CE. The UE may use the RS in the notified TCI state as the BFD-RS for BFD.

In a case where a plurality of QCLs (for example, a QCL type A and a QCL type D) are configured for the notified TCI state, the BFD-RS may be a QCL type D-RS among the plurality of QCLs or may be a QCL type D-RS and a periodic (P)-RS among the plurality of QCLs.
[Notification Method 3]
The CORESET ID may be notified by a field in the MAC CE. The UE may use the RS in the TCI state corresponding to the notified CORESET ID as the BFD-RS for BFD.

In a case where a plurality of QCLs (for example, a QCL type A and a QCL type D) are configured for the notified TCI state, the BFD-RS may be a QCL type D-RS among the plurality of QCLs or may be a QCL type D-RS and a periodic (P)-RS among the plurality of QCLs.

In the MAC CE2, BFD using the BFD-RS may be enabled after a preparation period (for example, a given period) has elapsed since the BFD-RS had been updated by the MAC CE. For example, the BFD-RS may be updated after 3 ms (preparation period) has elapsed since transmission of the ACK to the PDSCH carrying the MAC CE. In BFD, a plurality of samples (measurement) may be required for averaging processing of received power/received quality, and a preparation period therefor may be required. The UE does not have to perform BFD in a period until the preparation period elapses (does not have to start the BFD operation or does not have to perform the BFD operation). The UE may perform BFD using the BFD-RS before updating in a period until the preparation period elapses.

Figure 5:
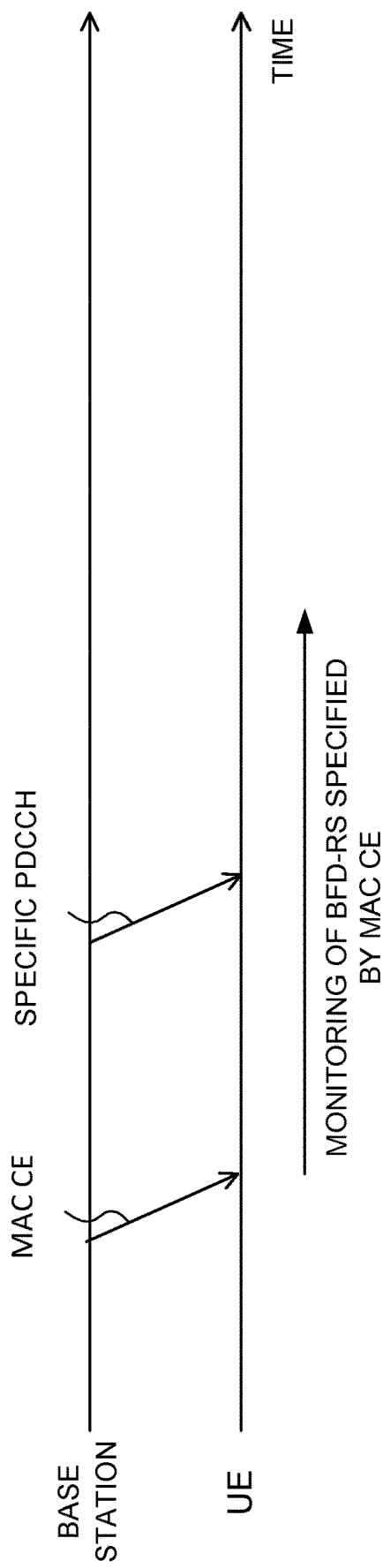
FIG. 5 is a view illustrating another example of BFD-RS monitoring in the third embodiment.

In the example of FIG. 5, before and after completion of the BFR, the UE monitors the BFD-RS specified by the MAC CE.

According to the third embodiment described above, the UE can be appropriately configured with the BFD-RS by the MAC CE.

Fourth Embodiment

UE capability indicating that the UE supports at least one operation of the first to third embodiments may be defined. In a case where the UE makes a notification of its UE capability, at least one operation of the first to third embodiments may be performed.

An RRC parameter that enables at least one operation of the first to third embodiments may be defined. The UE may perform at least one operation of the first to third embodiments in a case where its RRC parameters are configured.

According to the fourth embodiment described above, the UE can appropriately perform BFD while maintaining compatibility with existing specifications.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 6:
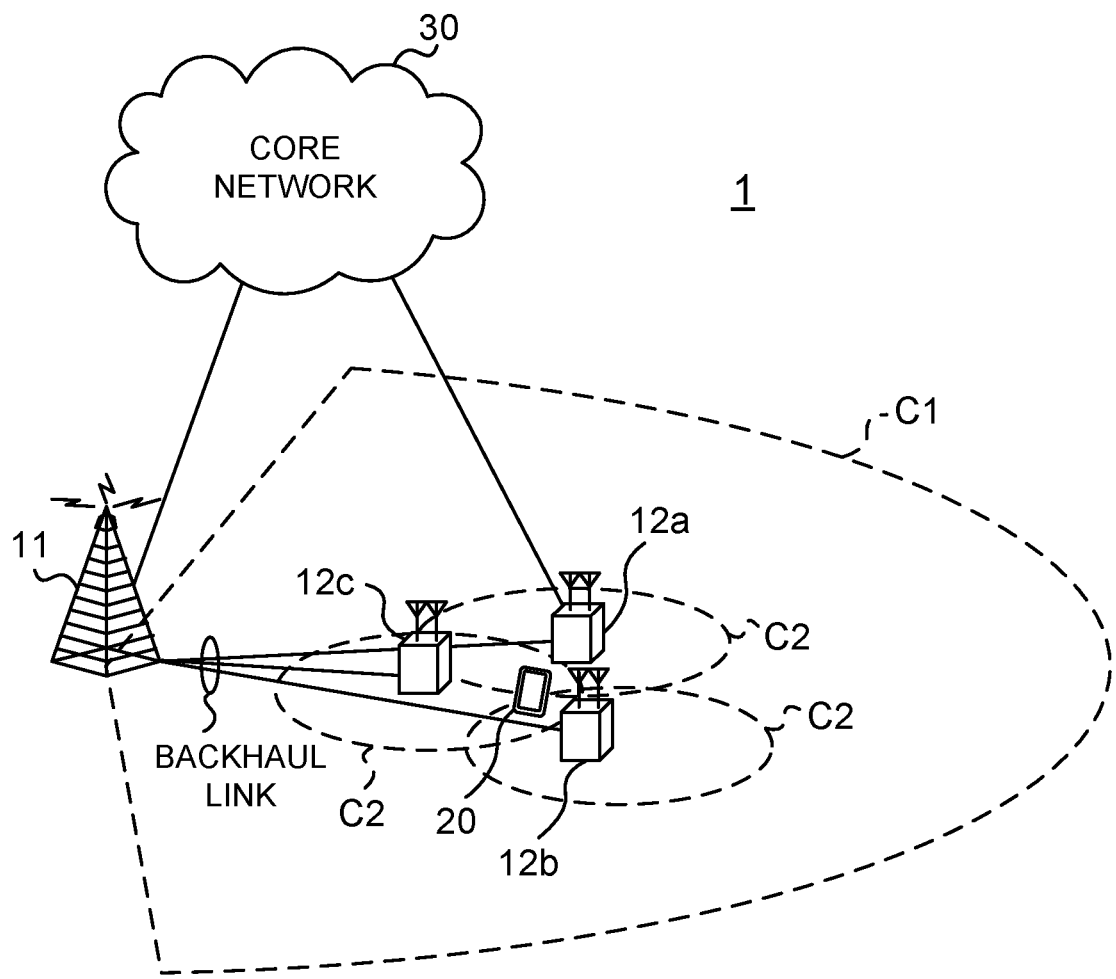
FIG. 6 is a view illustrating an example of a schematic configuration of a radio communication system according to one embodiment.

FIG. 6 is a view illustrating an example of a schematic configuration of a radio communication system according to one embodiment. A radio communication system 1 may be a system that implements communication using long term evolution (LTE), 5th generation mobile communication system New Radio (5G NR), and the like, drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like, of cells and the user terminals 20 are not limited to the aspects illustrated in the drawings. Hereinafter, the base stations 11 and 12 will be collectively referred to as a "base station 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) or dual connectivity (DC).

Each CC may be included in at least one of a frequency range 1 (FR1) or a frequency range 2 (FR2). The macro cell C1 may be included in the FR1, and the small cell C2 may be included in the FR2. For example, the FR1 may be a frequency range of 6 GHz or less (sub-6 GHz), and the FR2 may be a frequency range higher than 24 GHz (above-24 GHz). Note that the frequency ranges, definitions, and the like, of the FR1 and the FR2 are not limited thereto, and, for example, the FR1 may correspond to a frequency range higher than the FR2.

Further, the user terminal 20 may perform communication in each CC using at least one of time division duplex (TDD) or frequency division duplex (FDD).

The plurality of base stations 10 may be connected in a wired (e.g., an optical fiber or an X2 interface in compliance with common public radio interface (CPRI)) or wireless manner (e.g., NR communication). For example, in a case where NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), or a next generation core (NGC).

The user terminal 20 may a terminal that corresponds to at least one of communication methods such as LTE, LTE-A, and 5G.

In the radio communication system 1, a radio access scheme based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like, may be used.

The radio access scheme may be referred to as a waveform. Note that in the radio communication system 1, another radio access scheme (for example, another single carrier transmission scheme or another multi-carrier transmission scheme) may be used as the UL and DL radio access scheme.

In the radio communication system 1, as a downlink channel, a physical downlink shared channel (PDSCH), a physical broadcast channel (PBCH), a physical downlink control channel (PDCCH), or the like, shared by the user terminals 20 may be used.

Further, in the radio communication system 1, as an uplink channel, a physical uplink shared channel (PUSCH), a physical uplink control channel (PUCCH), a physical random access channel (PRACH), or the like, shared by the user terminals 20 may be used.

User data, higher layer control information, a system information block (SIB), and the like, are transmitted on the PDSCH. The PUSCH may transmit the user data, the higher layer control information, and the like. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be read as DL data, and the PUSCH may be read as UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a given search space based on search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like, in the present disclosure may be read as each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like, may be expressed without "link". Various channels may be expressed without adding "physical" at the beginning thereof.

In the radio communication system 1, a synchronization signal (SS), a downlink reference signal (DL-RS), and the like, may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like, may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like, may also be referred to as a reference signal.

Furthermore, in the radio communication system 1, a measurement reference signal (sounding reference signal (SRS)), a demodulation reference signal (DMRS), or the like, may be transmitted as an uplink reference signal (UL-RS). Note that, DMRSs may be referred to as "user terminal-specific reference signals (UE-specific Reference Signals)."

(Base Station)

Figure 7:
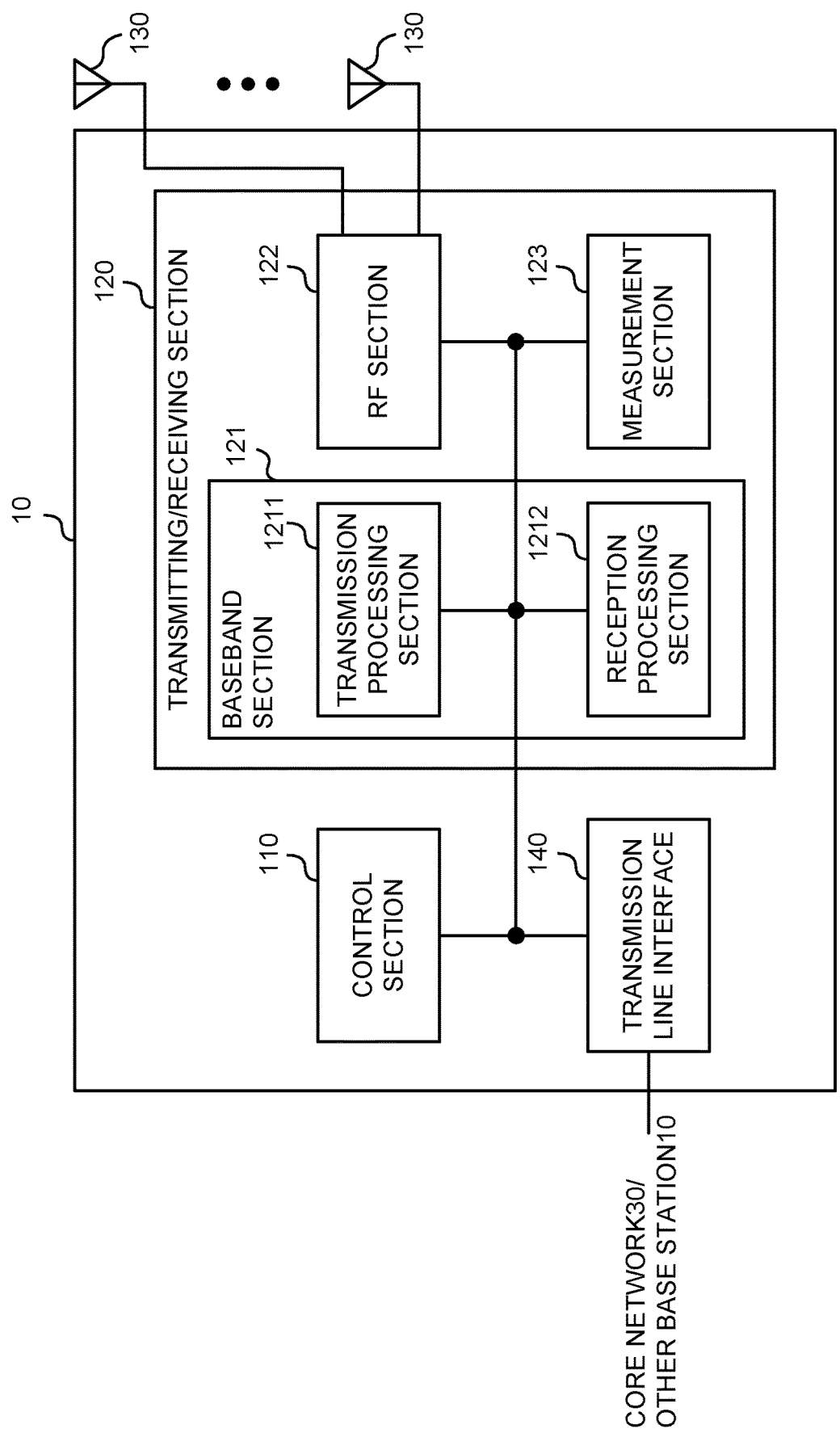
FIG. 7 is a view illustrating an example of a configuration of a base station according to one embodiment.

FIG. 7 is a view illustrating an example of a configuration of the base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be included.

Note that this example mainly describes a functional block which is a characteristic part of the present embodiment, and it may be assumed that the base station 10 also has another functional block necessary for radio communication. Part of processing of each section described below may be omitted.

The control section 110 controls the entire base station 10. The control section 110 can be implemented by a controller, a control circuit, and the like, that are described based on common recognition in the technical field related to the present disclosure.

The control section 110 may control signal generation, scheduling (for example, resource allocation or mapping), and the like. The control section 110 may control transmission/reception, measurement, and the like, using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like, to the transmitting/receiving section 120. The control section 110 may perform call processing (such as configuration and releasing) of a communication channel, management of a state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like, that are described based on common recognition in the technical field related to the present disclosure.

The transmitting/receiving section 120 may be configured as an integrated transmitting/receiving section or may be configured by a transmitting section and a receiving section. The transmitting section may include the transmission processing section 1211 and the RF section 122. The receiving section may be implemented by the reception processing section 1212, the RF section 122, and the measurement section 123.

The transmission/reception antennas 130 can be implemented by antennas described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, on, for example, data, control information, and the like, acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like, on the baseband signal and may transmit a signal in the radio frequency band via the transmission/reception antenna 130.

Meanwhile, the transmitting/receiving section 120 (RF section 122) may perform amplification, filtering processing, demodulation to a baseband signal, and the like, on the signal in the radio frequency band received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data, and the like.

The transmitting/receiving section 120 (measurement section 123) may perform measurement on the received signal. For example, the measurement section 123 may perform radio resource management (RRM), channel state information (CSI) measurement, and the like, based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like, user data (user plane data), control plane data, and the like, for the user terminal 20.

Note that the transmitting section and the receiving section of the base station 10 in the present disclosure may include at least one of the transmitting/receiving section 120, the transmission/reception antenna 130, or the transmission line interface 140.

The transmitting/receiving section 120 may transmit the first reference signal. After a response to a beam failure detected based on the first reference signal is transmitted, the control section 110 may control transmission of a second reference signal that is not configured as a failure detection resource for detection of the beam failure.

(User Terminal)

Figure 8:
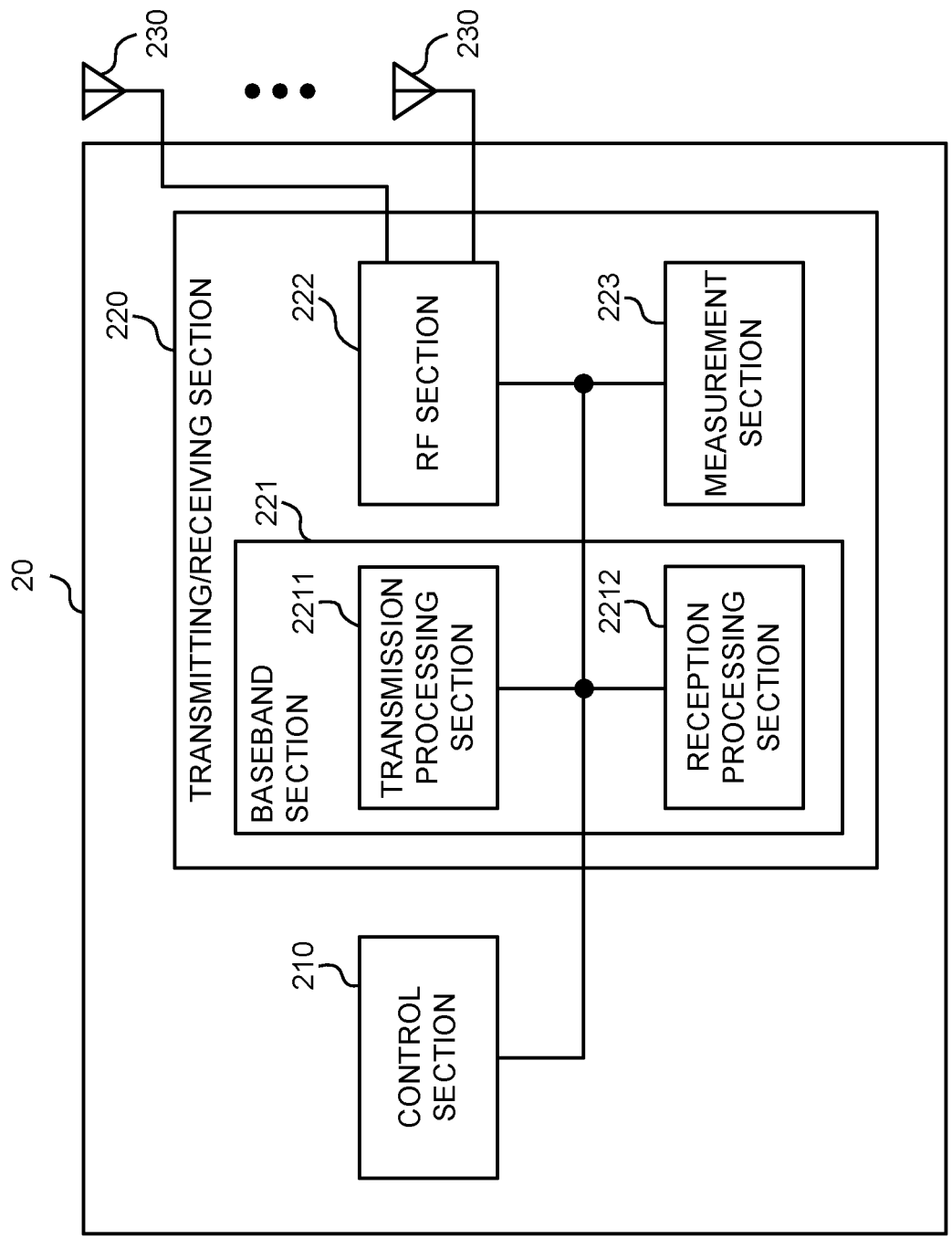
FIG. 8 is a view illustrating an example of a configuration of a user terminal according to one embodiment.

FIG. 8 is a view illustrating an example of a configuration of the user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. Part of processing of each section described below may be omitted.

The control section 210 controls the entire user terminal 20. The control section 210 can include a controller, a control circuit, and the like, that are described based on common recognition in the technical field related to the present disclosure.

The control section 210 may control signal generation, mapping, and the like. The control section 210 may control transmission/reception, measurement, and the like, using the transmitting/receiving section 220 and the transmission/reception antenna 230. The control section 210 may generate data, control information, a sequence, and the like, to be transmitted as signals and may forward the data, control information, sequence, and the like, to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be implemented by a transmitter/receiver, an RF circuit, a baseband circuit, a filter, a phase shifter, a measurement circuit, a transmission/reception circuit, and the like, that are described based on common recognition in the technical field related to the present disclosure.

The transmitting/receiving section 220 may be configured as an integrated transmitting/receiving section or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, on, for example, data, control information, and the like, acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a given channel (e.g., PUSCH), the transmitting/receiving section 220 (transmission processing section 2211) may perform DFT processing as the transmission processing in order to transmit the channel using a DFT-s-OFDM waveform. In a case where transform precoding is not enabled, DFT processing need not be performed as the transmission processing.

The transmitting/receiving section 220 (RF section 222) may perform modulation to a radio frequency band, filtering processing, amplification, and the like, on the baseband signal, to transmit a signal in the radio frequency band via the transmission/reception antenna 230.

Meanwhile, the transmitting/receiving section 220 (RF section 222) may perform amplification, filtering processing, demodulation to a baseband signal, and the like, on the signal in the radio frequency band received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data, and the like.

The transmitting/receiving section 220 (measurement section 223) may perform measurement on the received signal. For example, the measurement section 223 may perform RRM measurement, CSI measurement, and the like, based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220, the transmission/reception antenna 230, or the transmission line interface 240.

The transmitting/receiving section 220 may receive the first reference signal. After a response to a beam failure detected based on the first reference signal is received, the control section 210 may use the second reference signal that is not configured as the failure detection resource for the detection of the beam failure.

The first reference signal may be configured as the failure detection resource.

The failure detection resource does not have to be configured.

The second reference signal may be any of a reference signal reported in the beam failure recovery, a reference signal specified for a control resource set, or a reference signal specified by a medium access control-control element.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. In other words, each functional block may be implemented by a single apparatus physically or logically aggregated or may be implemented by directly or indirectly connecting two or more physically or logically separate apparatuses (for example, in a wired manner or a wireless manner) and using these apparatuses. The functional block may be implemented by combining the one apparatus or the plurality of apparatuses with software.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 9:
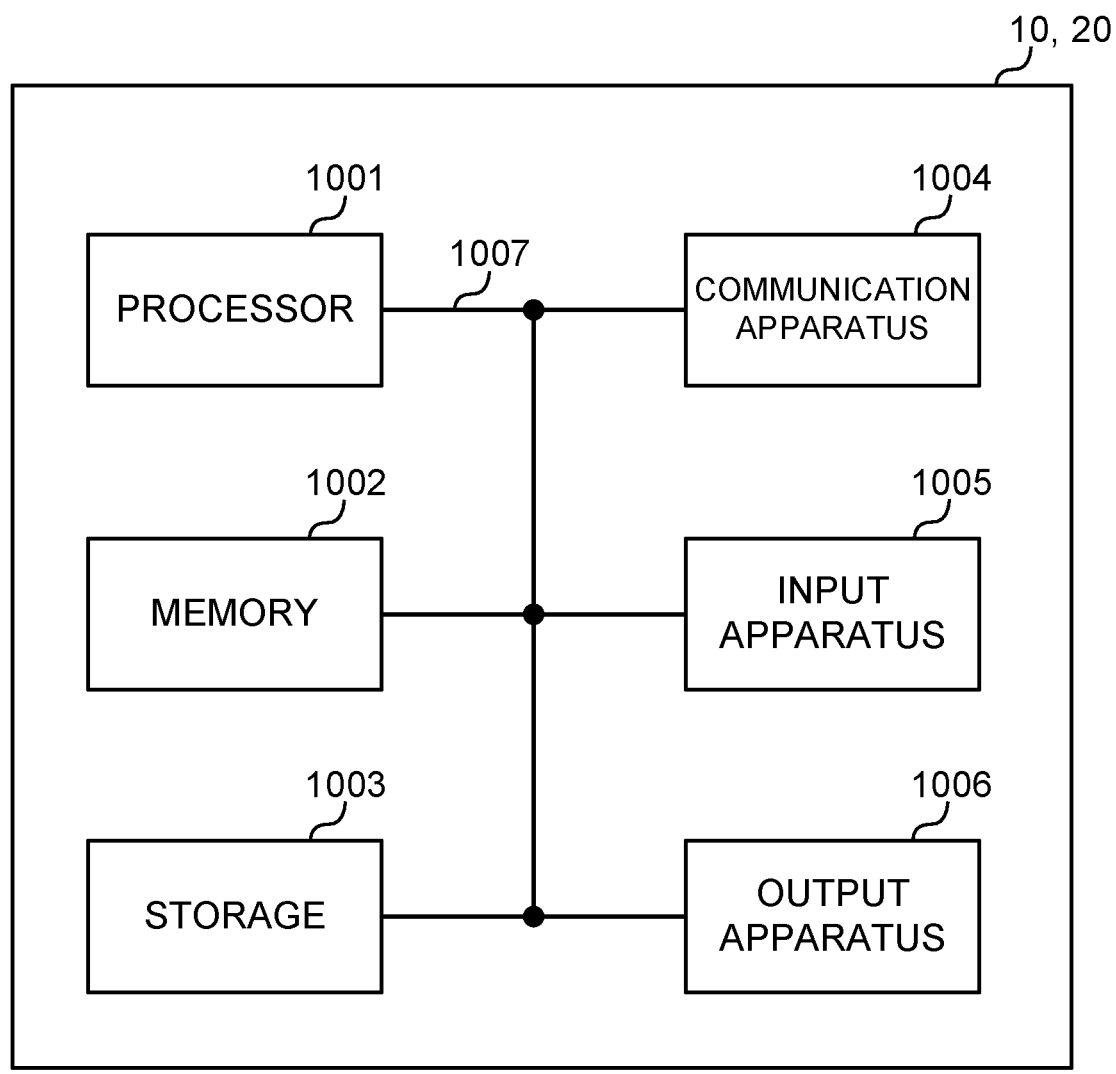
FIG. 9 is a view illustrating an example of a hardware configuration of the base station and the user terminal according to one embodiment.

For example, the base station, the user terminal, and the like, according to one embodiment of the present disclosure may function as a computer that executes the processing of the radio communication method of the present disclosure. FIG. 9 is a view illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section and a unit can be read as each other. The hardware configuration of the base station 10 and the user terminal 20 may be designed to include one or more of the apparatuses illustrated in the drawings or may be designed not to include some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by given software (program) being read on hardware such as the processor 1001 and the memory 1002, by which the processor 1001 performs operations, controlling communication via the communication apparatus 1004, and controlling at least one of reading or writing of data from/to the memory 1002 and the storage 1003.

The processor 1001 controls the whole computer by, for example, running an operating system. The processor 1001 may be constituted with a central processing unit (CPU) including an interface with peripheral equipment, a control apparatus, an operation apparatus, a register, and the like. For example, at least part of the above-described control section 110 (210), transmitting/receiving section 120 (220), and the like, may be implemented by the processor 1001.

The processor 1001 reads programs (program codes), software modules, data, etc. from at least one of the storage 1003 or the communication apparatus 1004 into the memory 1002 and performs various types of processing according to these. As the program, a program that causes a computer to execute at least part of the operation described in the above-described embodiment is used. For example, the control section 110 (210) may be implemented by control programs that are stored in the memory 1002 and that run on the processor 1001, and other functional blocks may be implemented in a similar manner.

The memory 1002 is a computer-readable recording medium and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store programs (program codes), software modules, etc. that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM), and the like), a digital versatile disk, a Blu-ray (registered trademark) disk, a removable disk, a hard disk drive, a smart card, a flash memory device (for example, a card, a stick, or a key drive), a magnetic stripe, a database, a server, or other appropriate storage media. The storage 1003 may be referred to as a "secondary storage apparatus."

The communication apparatus 1004 is hardware (transmission/reception device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like, in order to implement, for example, at least one of frequency division duplex (FDD) or time division duplex (TDD). For example, the transmitting/receiving section 120 (220), the transmission/reception antenna 130 (230), and the like, described above may be implemented by the communication apparatus 1004. The transmitting/receiving section 120 (220) may be implemented by being physically or logically separated into a transmitting section 120a (220a) and a receiving section 120b (220b).

The input apparatus 1005 is an input device for receiving input from outside (for example, a keyboard, a mouse, a microphone, a switch, a button, a sensor, or the like). The output apparatus 1006 is an output device that performs output to outside (for example, a display, a speaker, a light emitting diode (LED) lamp, or the like). Note that the input apparatus 1005 and the output apparatus 1006 may be provided in an integrated structure (for example, a touch panel).

Furthermore, these apparatuses including the processor 1001, the memory 1002, and the like, are connected by a bus 1007 so as to communicate information. The bus 1007 may be constituted with a single bus or may be constituted with buses that vary between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

Modifications

Note that terms described in the present disclosure and terms necessary for understanding the present disclosure may be read as terms that have the same or similar meanings. For example, a channel, a symbol, and a signal (signal or signaling) may be read as each other. Further, the signal may be a message. The reference signal can be abbreviated as an RS and may be referred to as a pilot, a pilot signal, and the like, depending on which standard applies. Further, a component carrier (CC) may be referred to as a cell, a frequency carrier, a carrier frequency, and the like.

A radio frame may be constituted with one or more periods (frames) in a time domain. Each of the one or more periods (frames) included in the radio frame may be referred to as a subframe. Further, the subframe may include one or more slots in the time domain. The subframe may be a fixed time duration (for example, 1 ms) that does not depend on numerology.

Here, the numerology may be a communication parameter to be applied to at least one of transmission or reception of a given signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing to be performed by a transceiver in a frequency domain, or specific windowing processing to be performed by a transceiver in the time domain.

The slot may include one or more symbols in the time domain (orthogonal frequency division multiplexing (OFDM) symbols, single carrier frequency division multiple access (SC-FDMA) symbols, and the like). Also, the slot may be a time unit based on the numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) to be transmitted in a time unit larger than the mini slot may be referred to as "PDSCH (PUSCH) mapping type A". A PDSCH (or a PUSCH) to be transmitted using a mini slot may be referred to as "PDSCH (PUSCH) mapping type B".

A radio frame, a subframe, a slot, a mini slot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be read as each other.

For example, one subframe may be referred to as TTI, a plurality of consecutive subframes may be referred to as TTI, or one slot or one mini slot may be referred to as TTI. In other words, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot", or the like, instead of a "subframe."

Here, the TTI refers to a minimum time unit of scheduling in radio communication, for example. For example, in the LTE system, a base station performs scheduling to allocate radio resources (a frequency bandwidth, transmission power, and the like, that can be used in each user terminal) to each user terminal in TTI units. Note that definition of the TTI is not limited to this.

The TTI may be a transmission time unit of a channel-coded data packet (transport block), a code block, a codeword, etc. or may be a processing unit of scheduling, link adaptation, etc. When the TTI is given, a time interval (e.g., the number of symbols) to which a transport block, a code block, a codeword, or the like, is actually mapped may be shorter than the TTI.

Note that, in a case where one slot or one mini slot is referred to as a "TTI", one or more TTIs (that is, one or more slots or one or more mini slots) may be a minimum time unit of scheduling. Also, the number of slots (the number of mini slots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (partial or fractional TTI), a shortened subframe, a short subframe, a mini slot, a subslot, a slot, or the like.

Note that a long TTI (for example, a normal TTI, a subframe, etc.) may be read as a TTI having a time duration exceeding 1 ms, and a short TTI (for example, a shortened TTI) may be read as a TTI having a TTI duration less than the TTI duration of a long TTI and not less than 1 ms.

A resource block (RB) is the unit of resource allocation in the time domain and the frequency domain and may include one or more contiguous subcarriers in the frequency domain. The number of subcarriers included in the RB may be the same regardless of the numerology and may be twelve, for example. The number of subcarriers included in the RB may be determined based on the numerology.

Also, the RB may include one or more symbols in the time domain and may be one slot, one mini slot, one subframe or one TTI in length. One TTI, one subframe, etc. may each be constituted with one or more resource blocks.

Note that one or more RBs may be referred to as a physical resource block (PRB), a sub-carrier group (SCG), a resource element group (REG), a PRB pair, an RB pair, and the like.

Furthermore, the resource block may include one or more resource elements (REs). For example, one RE may be a radio resource field of one subcarrier and one symbol.

A bandwidth part (BWP) (which may be referred to as a partial bandwidth, or the like) may represent a subset of contiguous common resource blocks (RBs) for a given numerology in a given carrier. Here, the common RB may be specified by the index of the RB based on a common reference point of the carrier. PRBs may be defined in a BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE does not have to assume transmission/reception of a given signal/channel outside the active BWP. Note that a "cell", a "carrier", etc. in the present disclosure may be read as a "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like, can be variously changed.

The information, parameters, etc. described in the present disclosure may be represented using absolute values or may be represented using relative values with respect to given values or may be represented using other corresponding information. For example, a radio resource may be specified by a given index.

The names used for parameters etc. in the present disclosure are in no respect limiting. Further, any mathematical expression, or the like, that uses these parameters may differ from those explicitly disclosed in the present disclosure. Various channels (PUCCH, PDCCH, and the like) and information elements can be identified by any suitable names, and thus, various names allocated to these various channels and information elements are not restrictive names in any respect.

The information, signals, etc. described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals, and the like, can be output in at least one of a direction from a higher layer to a lower layer or a direction from a lower layer to a higher layer. Information, signals, and the like, may be input and output via a plurality of network nodes.

The information, signals, and the like, that are input and/or output may be stored in a specific location (for example, in a memory) or may be managed in a control table. The information, signals, and the like, to be input and output can be overwritten, updated, or appended. The output information, signals, and the like, may be deleted. The information, signals, and the like, that are input may be transmitted to other apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, notification of given information (for example, notification of information to the effect that "X holds") does not necessarily have to be performed explicitly and can be performed implicitly (for example, by not making notification of the given information or by making notification of another information).

Determination may be performed using values represented by one bit (0 or 1), may be performed using boolean values that represent true or false or may be performed by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, instructions, information, and the like, may be transmitted and received via communication media. For example, in a case where software is transmitted from a website, a server, or another remote source by using at least one of a wired technology (coaxial cable, optical fiber cable, twisted pair, digital subscriber line (DSL), or the like) or a wireless technology (infrared rays, microwaves, or the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide a communication service through a base station subsystem (for example, small base station for indoors (remote radio head (RRH))). The term "cell" or "sector" refers to part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

A mobile station may be referred to as a "subscriber station", "mobile unit", "subscriber unit", "wireless unit", "remote unit", "mobile device", "wireless device", "wireless communication device", "remote device", "mobile subscriber station", "access terminal", "mobile terminal", "wireless terminal", "remote terminal", "handset", "user agent", "mobile client", "client", or some other suitable terms.

At least one of the base station or the mobile station may be called as a transmission apparatus, a reception apparatus, a wireless communication apparatus, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during communication operation. For example, at least one of the base station or the mobile station may be an Internet of Things (IoT) device such as a sensor.

Further, the base station in the present disclosure may be read as the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the functions of the base station 10 described above. Further, terms such as "uplink" and "downlink" may be read as terms corresponding to communication between terminals (for example, "side"). For example, an uplink channel and a downlink channel may be read as a side channel.

Likewise, the user terminal in the present disclosure may be read as a base station. In this case, the base station 10 may have the functions of the user terminal 20 described above.

In the present disclosure, operation performed by the base station may be performed by an upper node thereof in some cases. In a network including one or more network nodes with base stations, it is clear that various kinds of operation performed for communication with a terminal can be performed by a base station, one or more network nodes (examples of which include but are not limited to mobility management entity (MME) and serving-gateway (S-GW)) other than the base station, or a combination thereof.

The aspects/embodiments described in the present disclosure may be used individually or in combinations, which may be switched depending on modes of implementation. Further, the order of processing procedure, sequences, flowcharts, and the like, of the aspects/embodiments described in the present disclosure may be re-ordered as long as there is no inconsistency. For example, although various methods have been described in the present disclosure with various components of steps using exemplary orders, the specific orders that are described herein are by no means limiting.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first", "second" and so on as used in the present disclosure does not generally limit the number/quantity or order of these elements. These designations can be used in the present disclosure, as a convenient way of distinguishing between two or more elements. Thus, reference to the first and second elements does not imply that only two elements may be employed, or that the first element must precede the second element in some way.

The term "determining" as used in the present disclosure may include a wide variety of operation. For example, "determining" may be regarded as judging, calculating, computing, processing, deriving, investigating, looking up (or searching or inquiring) (for example, looking up in a table, database, or another data structure), ascertaining, and the like.

Furthermore, "determining" as used herein may be interpreted to mean making determination related to receiving (for example, receiving information), transmitting (for example, transmitting information), inputting, outputting, accessing (for example, accessing data in a memory) and so on.

In addition, "determining" as used herein may be interpreted to mean making determination related to resolving, selecting, choosing, establishing, comparing and so on. In other words, "determining" as used herein may be interpreted to mean making determination related to some action.

In addition, "determining" as used herein may be interpreted to mean "assuming", "expecting", "considering" and so on.

The "maximum transmission power" described in the present disclosure may mean a maximum value of transmission power, nominal UE maximum transmit power, or rated UE maximum transmit power.

The terms "connected" and "coupled" used in the present disclosure, or any variation of these terms mean all direct or indirect connection or coupling between two or more elements and may include presence of one or more intermediate elements between two elements that are "connected" or "coupled" to each other. The coupling or connection between the elements may be physical, logical, or a combination of these. For example, "connection" may be read as "access".

In the present disclosure, in a case where two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the term "A and B are different" may mean "A and B are different from each other". Note that the term may mean that "A and B are different from C". The terms such as "separate", "coupled", and the like, may be interpreted similarly to "different".

In a case where "include", "including", and variations of these are used in the present disclosure, these terms are intended to be inclusive similarly to the term "comprising". Moreover, the term "or" used in the present disclosure is intended to be not an exclusive-OR.

In the present disclosure, in a case where articles are added by translation, for example, as "a", "an", and "the" in English, the present disclosure may include nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples and should by no means be construed to limit the invention according to the present disclosure in any way.

The invention claimed is:

1. A terminal comprising:
   a receiver that receives a beam failure detection reference signal (BFD-RS) indication medium access control-control element (MAC CE) including a first ID indicating a bandwidth part (BWP) and a second ID indicating a resource for a BFD-RS for detecting a beam failure; and
   a processor that performs BFD based on the second ID in the BWP indicated by the first ID,
   wherein the processor does not detect beam failure for a given non-zero period of time after receiving the BFD-RS indication MAC CE.

2. The terminal according to claim 1, wherein the BFD-RS indicated by the second ID is included in a BFD-RS set configured for the BWP.

3. The terminal according to claim 1, wherein a channel state information reference signal (CSI-RS) index is used as the second ID.

4. A radio communication method for a terminal, comprising:
   receiving a beam failure detection reference signal (BFD-RS) indication medium access control-control element (MAC CE) including a first ID indicating a bandwidth part (BWP) and a second ID indicating a resource for a BFD-RS for detecting beam failure;
   performing BFD based on the second ID in the BWP indicated by the first ID; and
   not detecting beam failure for a given non-zero period of time after receiving the BFD-RS indication MAC CE.

5. A system comprising a terminal and a base station, wherein
   the terminal comprises:
      a receiver that receives a beam failure detection reference signal (BFD-RS) indication medium access control-control element (MAC CE) including a first ID indicating a bandwidth part (BWP) and a second ID indicating a resource for a BFD-RS for detecting beam failure; and
      a processor that performs BFD based on the second ID in the BWP indicated by the first ID,
      wherein the processor does not detect beam failure for a given non-zero period of time after receiving the BFD-RS indication MAC CE, and
   the base station comprises:
      a transmitter that transmits the BFD-RS indication MAC CE and the BFD-RS.

6. The terminal according to claim 1, wherein the processor starts a beam failure detection timer after detecting the beam failure.

7. The terminal according to claim 1, wherein the given non-zero period of time is at least 3 ms.

* * * * *